United States Patent [19]

McEntire et al.

[11] Patent Number: 5,149,017

[45] Date of Patent: Sep. 22, 1992

[54] SERVICE TRANSPORT UNIT

[75] Inventors: Jay McEntire, Anaheim Hills; Richard Haglund, Manhattan Beach; Ed Johnson, Corona Del Mar; J. Garrett MacFarlane, Torrance, all of Calif.

[73] Assignee: Teledyne Inet, Torrance, Calif.

[21] Appl. No.: 792,959

[22] Filed: Nov. 15, 1991

[51] Int. Cl.⁵ .................................. B64F 1/00
[52] U.S. Cl. .................... 244/114 R; 244/137.2; 14/71.5; 191/12 R; 174/DIG. 9; 285/133.1; 248/49
[58] Field of Search .............. 244/114 R, 137.2; 14/71.5; 191/12 R; 113/114; 174/69, DIG. 9; 285/131, 133.1; 248/49, 75

[56] References Cited

U.S. PATENT DOCUMENTS

| | | | |
|---|---|---|---|
| 3,433,889 | 3/1969 | DeVries | 191/12 R |
| 3,792,189 | 2/1974 | Stengel | 191/12 R |
| 3,859,481 | 1/1975 | Sprague | 244/114 R |
| 4,543,677 | 10/1985 | Haglund et al. | 14/71.5 |
| 4,620,339 | 11/1986 | Shepheard | 191/12 R |
| 4,715,077 | 12/1987 | Shepheard | 248/49 X |

Primary Examiner—Joseph F. Peters, Jr.
Assistant Examiner—Christopher P. Ellis

[57] ABSTRACT

A service transport unit for providing utilities to a parked aircraft, by way of a utility bundle, comprising a box attached to a passenger loading bridge, at least one slider and corresponding utility bundle tracker slidably mounted within the box wherein the utility bundle is fixed to the outboard terminus of the slider. The slider is mounted in the box and affixed to the passenger loading bridge so that it is pulled from within the container by extension of the passenger loading bridge, and pushed back into the box when the bridge is retracted. The utility bundle is passively extended and retracted by movement of the slider. The slider and utility bundle tracker also serve to guide the utility bundle and prevent it from tangling or kinking during movement of the passenger loading bridge.

28 Claims, 3 Drawing Sheets

6
SERVICE TRANSPORT UNIT

This application relates to a device for providing utilities to a parked aircraft. More particularly, this application relates to a service transport unit, mounted upon an extendable passenger loading bridge, which permits utility lines to be passively extended and retracted by the movement of the passenger loading bridge without kinking, folding or damaging them.

BACKGROUND OF THE INVENTION

It is desirable to provide parked aircraft with power, potable water, conditioned air and the like (collectively "utilities") from facilities within a passenger terminal or other ground-based facility. The prior art teaches that these can be supplied to a parked aircraft by attaching lines carrying utilities ("utility lines") to an extendable passenger loading bridge. See. e.q. U.S. Pat. Nos. 3,521,316 and 3,859,481. Through this arrangement, the utility lines will be extended and retracted by movement of the passenger loading bridge, without the need for an additional power source.

A difficulty with this approach is that the utility lines tend to become tangled, twisted or kinked upon repeated extension and retraction of the passenger loading bridge. The prior art refers to a number of approaches to this problem, none of which has been completely satisfactory. The '316 patent, for example, refers to a system of rollers and cables for suspending the utility lines from a passenger loading bridge. U.S. Pat. No. 4,620,339 (reissued as U.S. Pat. No. Re. 32,687) and U.S. Pat. No. 4,715,077 employ a related arrangement. U.S. Pat. No. 4,572,550 refers to a series of brackets attached to the passenger loading bridge by swivel mounts. These approaches are relatively costly and complex to use.

The '481 patent refers to suspending a series of trolleys from a single cable. U.S. Pat. No. 4,526,090 refers to a tray containing a Z-shaped connecting member that effects two 90° turns in a partly flexible conduit. The devices of the '481 patent and the '090 patent are complicated and appear to be relatively expensive to manufacture. Moreover, those devices are not believed to prevent the utility lines from becoming twisted or kinked.

SUMMARY OF THE INVENTION

The invention disclosed herein remedies the deficiencies of prior art devices by providing a service transport unit which permits utility lines to be passively extended and retracted by the corresponding movements of a passenger loading bridge which is simple in operation, has few moving parts and is inexpensive to manufacture. The service transport unit of this invention comprises a box attached to a passenger loading bridge, at least one slider and corresponding utility bundle tracker slidably mounted within the box, wherein the utility bundle is fixed to the slider. Each slider is affixed to the passenger loading bridge so that it is pulled from within the box by extension of the passenger loading bridge, and pushed back into the box when the bridge is retracted. The utility bundle is passively extended and retracted by movement of the slider because of its attachment thereto. The slider and utility bundle tracker also serve to guide the utility bundle and prevent it from tangling or kinking during movement of the passenger loading bridge.

DETAILED DESCRIPTION OF THE INVENTION

The service transport unit of the present invention is intended for use with passenger loading bridges comprising telescoping tunnels. Passenger loading bridges of this type are available, for example, from Jetway Systems, under model numbers 3 FRC HD and 2 FRC HD. Such passenger loading bridges are made in two and three tunnel designs. In the three tunnel design, there are three tunnels, each telescoping into the one closer to the passenger terminal. The tunnels are designated as the A, B and C tunnels, with the A tunnel closest to the passenger loading terminal. In the two tunnel design, the C tunnel is omitted.

Figure 1:
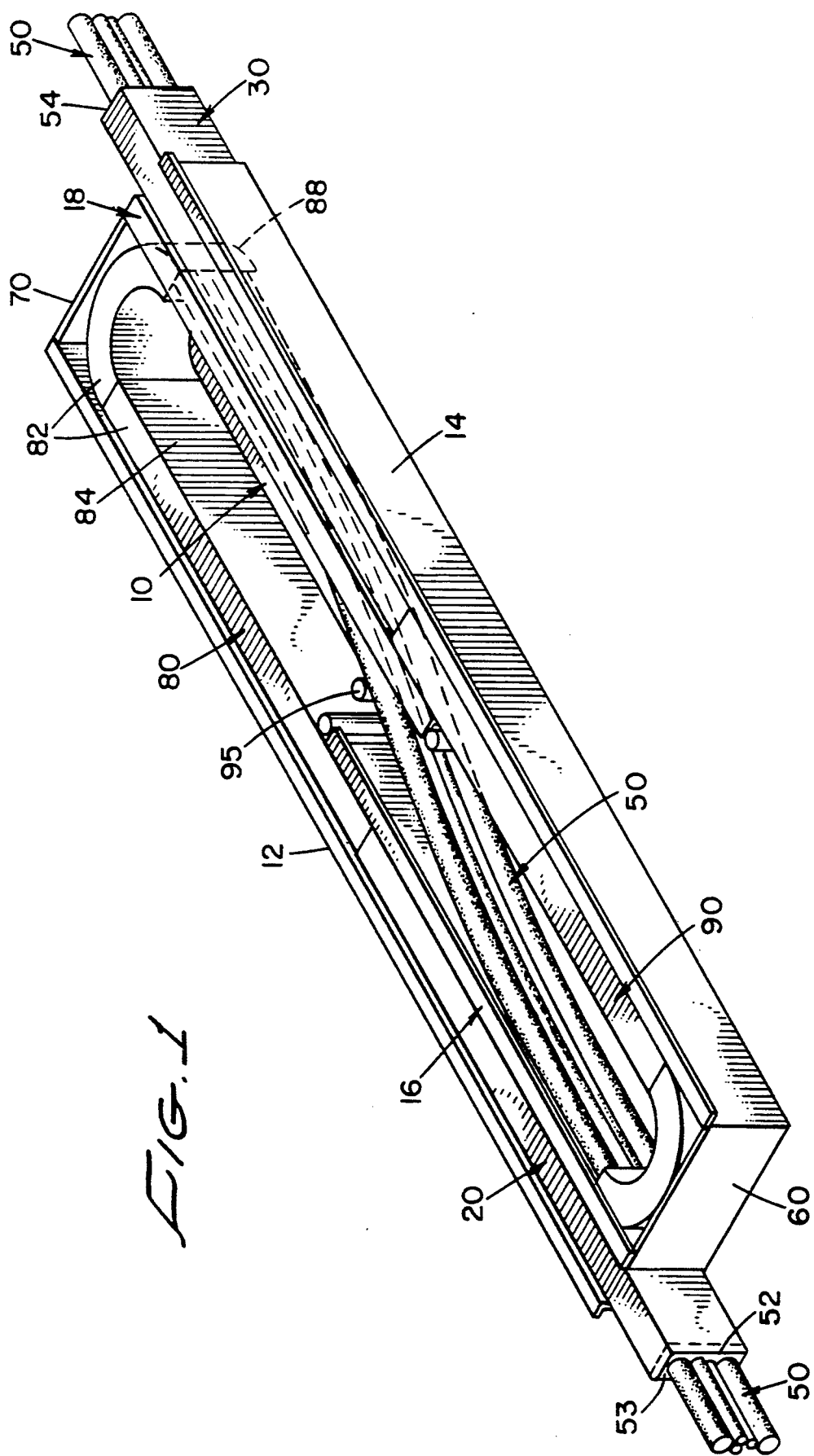
FIG. 1 is a side elevation of a service transport unit according to this invention.

When used in connection with a three tunnel design, a service transport unit according to the present invention is attached to the B tunnel, preferably by suspending the box beneath the B tunnel. In a three tunnel design, a pair of opposed sliders and corresponding utility bundle trackers, as shown in FIG. 1, are used. In a two tunnel design, the service transport unit may be attached to either the A or B tunnel, preferably the service transport unit is attached to the A tunnel. In a two tunnel design, only one slider and corresponding utility bundle tracker is required.

At the passenger terminal, utility lines are connected to utility supplies—a junction box for the supply of electrical power, an air handler unit for conditioned air, or an appropriate service cabinet. At the aircraft end of the utility lines they are connected to the respective aircraft service devices.

Referring now to FIG. 1, in the presently preferred embodiment the service transport unit comprises box 10 including parallel side walls 12 and 14. Sliders 20 and 30 are slidably mounted within box 10, with their long axes parallel to side walls 12 and 14. Sliders 20 and 30 are hollow and preferably rectangular in cross section. In the presently preferred embodiment, the sliders are extruded aluminum. Alternatively, the sliders may be formed of sheet aluminum.

Considering, for simplicity, the operation of a single slider and utility bundle tracker, slider 20 slides within box 10 between side Wall 12 and end piece 16. In the presently preferred embodiment, end piece 16 is an "L" shaped in cross section and is fabricated from sheet aluminum, and is attached to box 10 and to end wall 60. In an embodiment of the service transport unit that employs two elongate members, the location, fabrication and operation of the second slider 30 is identical to that described for slider 20, except that the orientation of second elongate member 30 is opposite to that of elongate member 20. The respective orientations and movements may be understood by reference to FIG. 1; the orientation and movement of elongate member 30 is the mirror image of that of elongate member 20, assuming the mirror plane to parallel side walls 12 and 14 of box 10. In an embodiment of this invention that employs two sliders, second slider 30 is disposed between side wall 14 and end piece 18, as shown in FIG. 1. End piece 18 is attached to box 10 and to end wall 70.

Figure 2:
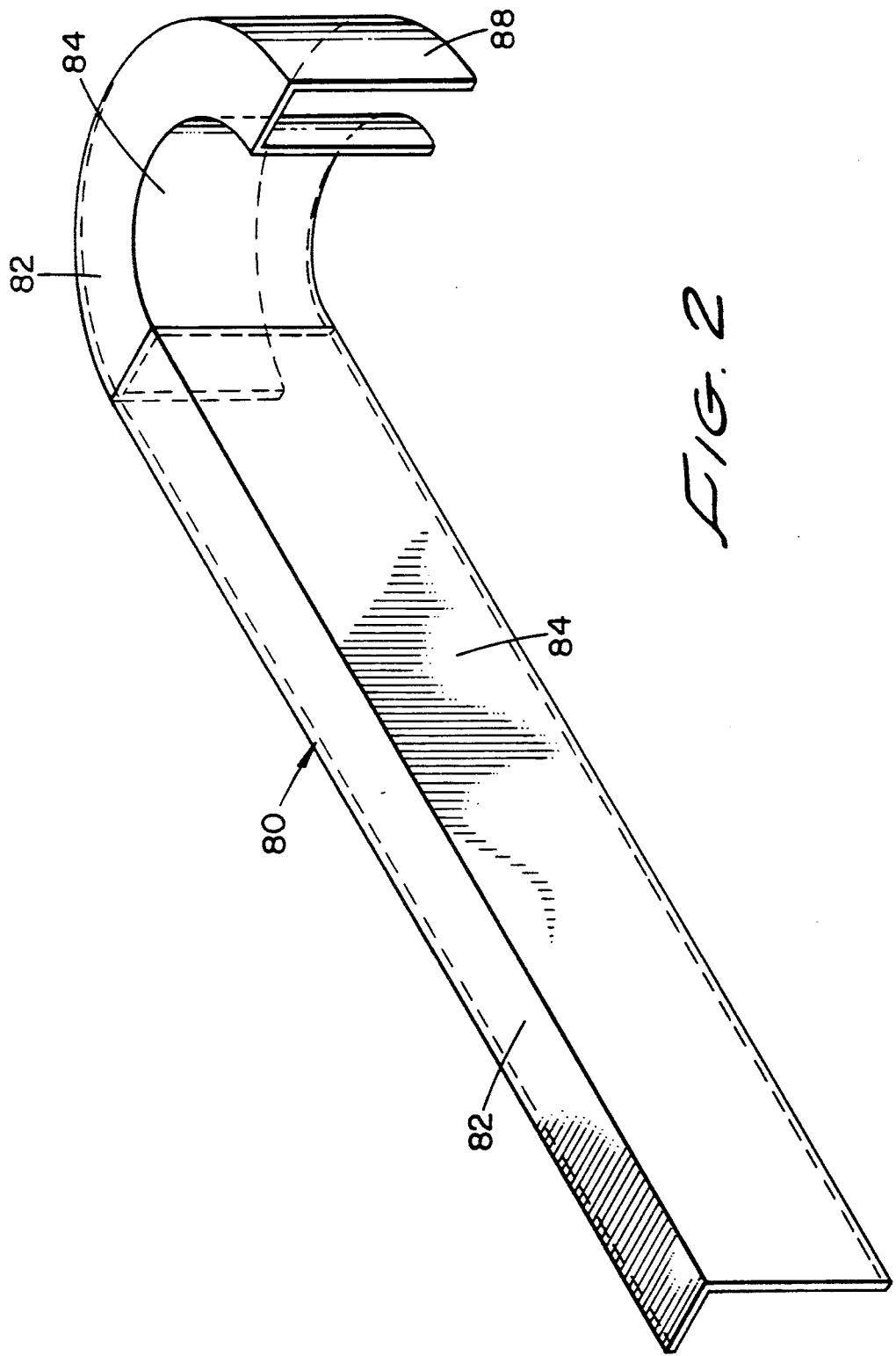
FIG. 2 is a side elevation of a utility bundle tracker partly in phantom.
Figure 3:
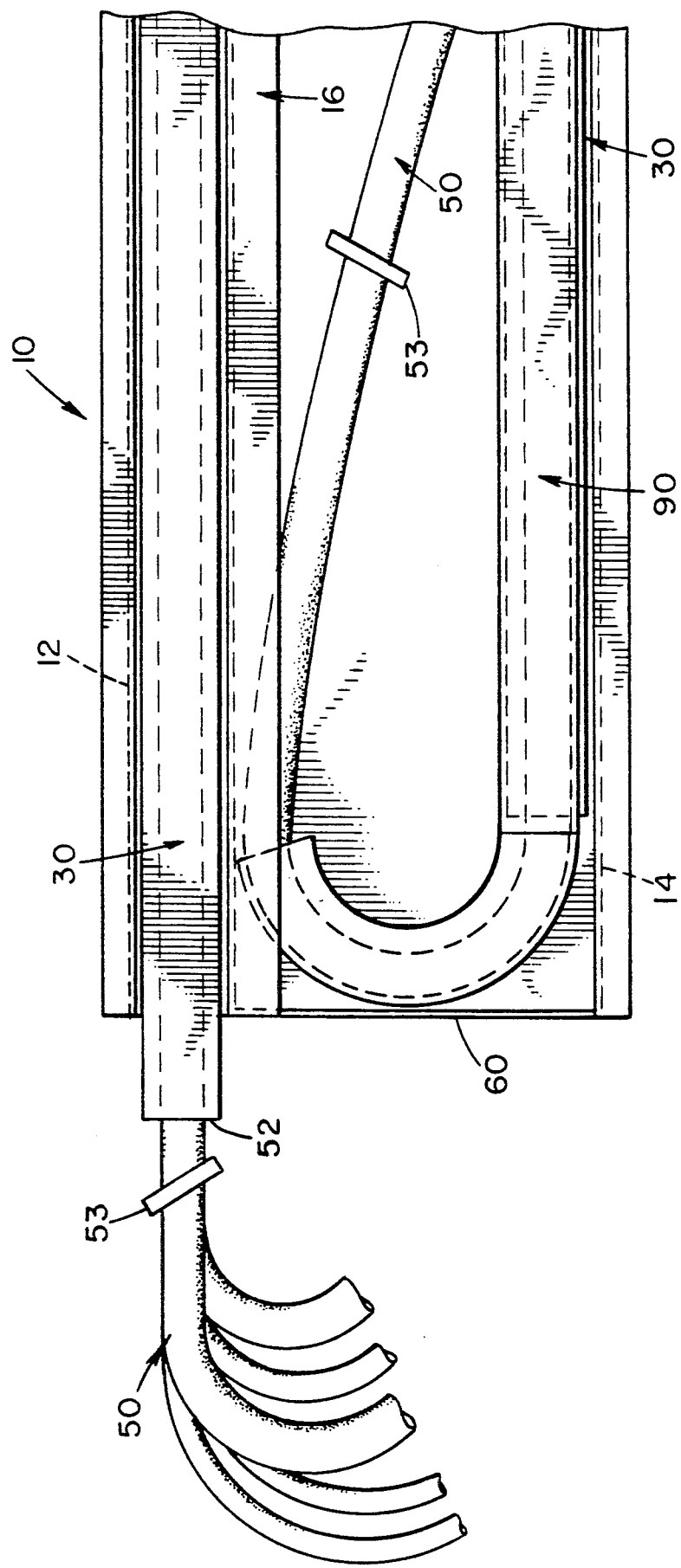
FIG. 3 is a plan view, partly in phantom, of a utility bundle tracker and corresponding slider drawn to show the relation between a utility bundle, utility bundle tracker, slider and utility line clip.

Utility bundle trackers 80 and 90 are both "J" shaped members, as shown in FIGS. 1 and in detail in FIG. 2 and FIG. 3 for the example of utility bundle tracker 80. As shown in FIG. 2, a utility bundle tracker is made up of a straight section joined to a curved section. In the preferred embodiment, the straight section of a utility bundle tracker comprises orthogonal surfaces 82 and 84. In its curved section, each utility bundle tracker has three metal surfaces: orthogonal surfaces 82 and 84 are continuous with the corresponding surfaces of the straight section, and a third surface 88, parallel to surface 84 is also present. Each utility bundle tracker effects a turn in the direction of the utility bundle of about 180°.

As shown in FIG. 1, utility bundle trackers 80 and 90 are slidably mounted upon sliders 20 and 30 respectively. To facilitate assembly, a notch may be cut in the lip of each end piece 16 and 18 at the point where the lip would overhang the free end of each utility bundle tracker 80 and 90. The notch would permit each utility bundle tracker to be lowered into place, clearing the respective lip of end pieces 16 and 18.

Utility bundle 50, including at least one utility line, is disposed within each slider and utility bundle tracker, as shown in FIG. 3 for slider 30 and utility bundle tracker 80. The utility lines comprising utility bundle 50 are held together by a plurality of utility bundle clips 53 that surround the utility bundle and secure the utility lines therein. At the outboard termini 52 and 54 of sliders 20 and 30 respectively, utility bundle 50 is secured to the slider by attaching a utility bundle clip 53 thereto. In the preferred embodiment, the approximate midpoint of utility bundle 50 is fastened to post 95, as shown in FIG. 1.

Certain utilities, such as compressed air and chilled water are provided under pressure. The utility lines carrying these utilities are subject to changes in shape when pressure is applied. On the other hand, other utility lines, carrying electrical power for example, are not subject to such changes during use. In order to avoid difficulties resulting from changes in the shape of the utility lines under pressure, in the preferred embodiment 1) the utility lines under pressure are fabricated from a hose that elongates by not more than 1% under a pressure load of 100 psi, and does not increase in diameter under pressure (Super Black Flexwing, Goodyear Tire & Rubber Co.); and 2) utility line clips were developed that accommodate elongation of the pressurized utility lines without distortion of the utility bundle.

The preferred utility line clips are blocks of ultra high molecular weight plastic (Advanced Plastics, Long Beach, Calif.) that is hard, machinable, lightweight, and has a low coefficient of friction, but is less expensive than teflon. Holes are drilled in the utility line clips to accommodate passage of each utility line. The holes for the lines subject to pressure are drilled to provide a snug fit, while the holes for the non-pressurized lines provide a loose fit. Tension is applied to the clip to secure the lines subject to pressure. In one embodiment, the holes for utility lines subject to pressure loading are near the periphery of the utility clip and are incomplete. In this embodiment, tension is applied to those utility lines by a nylon banding strap surrounding the periphery of the utility line clip. Alternatively, tension may be applied by through-bolts perpendicular to the axis of the utility lines. The utility clips are applied to the utility bundle when the utility lines that are pressurized in use are pressurized to about 50 psi.

Because they are attached to the passenger loading bridge, the elongate members are passively extended or retracted with respect to box 10 by the movement of the passenger loading bridge. Further, because the respective ends of utility bundle 50 are attached to the corresponding elongate members, when the passenger loading bridge is retracted, a portion of utility bundle 50 enters box 10 along with the elongate members. This additional portion of utility bundle 50 moves along the orthogonal surfaces of the utility bundle trackers causing the utility bundle trackers to slide toward the respective end plate of box 10.

The additional utility bundle entering box 10 due to the inward movement of sliders in either the one or two slider embodiments of this invention accumulates in a smoothly curved bundle as shown in FIG. 1. As is also apparent in FIG. 1, the respective end pieces cooperate with the utility bundle trackers in guiding the movement of the utility bundle during its movement.

In addition to the preferred embodiment of the service transport unit disclosed herein, other embodiments are within the scope of this invention. For example, the slider and utility bundle tracker may be formed in a single element, so that one could not move with respect to the other. Still other variations and modifications of the disclosed invention will be apparent. Accordingly, the scope of this invention is defined by the following claims, rather than by the foregoing description, which is intended merely to be illustrative of the preferred embodiments.

We claim:

1. A service transport unit for providing utilities to a parked aircraft comprising:
   a) a box attached to a passenger loading bridge;
   b) a slider slidably mounted within the box and attached to the passenger loading bridge;
   c) a utility bundle including at least one utility line attached to the slider; and
   d) a utility bundle tracker, including a curved member, that receives the utility bundle from the slider and which effects a turn in the direction of the utility bundle, whereby extension or retraction of the passenger loading bridge causes the utility bundle to be removed from, or pushed into the box.

2. The service transport unit of claim 1 wherein the turn is about 180°.

3. The service transport unit of claims 1 or 2 wherein the utility bundle tracker is slidably mounted upon the slider.

4. The service transport unit of claim 1 wherein the utility bundle tracker comprises two orthogonal surfaces.

5. The service transport unit of claim 1 wherein the slider is rectangular in cross section.

6. The service transport unit of claim 1 wherein the slider is hollow.

7. The service transport unit of claim 1 further comprising an end piece parallel to a side wall of the box, the end piece serving to guide the movement of the slider.

8. The service transport unit of claim 1 further comprising a post for securing the midpoint of the utility bundle.

9. The service transport unit of claim 1 wherein the utility lines comprising a utility bundle are held together with at least on utility bundle clip.

10. The service transport unit of claim 9 wherein said at least one utility bundle clip is attached to the slider.

11. The service transport unit of claim 1 wherein utility lines subject to pressure loading do not substantially expand in a radial dimension, and extend by about 1% upon pressure loading.

12. The service transport unit of claim 9 wherein utility lines not subject to pressure loading move within the utility bundle clip, while utility lines subject to pressure loading do not.

13. The service transport unit of claim 9 wherein utility lines subject to pressure loading are secured to the utility clip while utility lines not subject to pressure loading are not so secured.

14. A service transport unit for providing utilities to a parked aircraft comprising:
   a) a box attached to a passenger loading bridge;
   b) a first slider slidably mounted within the box and attached to the passenger loading bridge;
   c) a utility bundle including at least one utility line attached to the first slider;
   d) a first utility bundle tracker, including a curved member, that receives the utility bundle from the first slider and which effects a turn in the direction of the utility bundle;
   e) a second utility bundle tracker, including a curved member, slidably mounted within the box, that effects a turn in the direction of the utility bundle;
   f) a second slider with the utility bundle affixed thereto, slidably mounted within the box and receiving the utility bundle from the second utility bundle tracker, wherein the second slider and second utility bundle tracker are oriented so as to be disposed across a mirror plane, transecting the midline of the box and parallel to the side walls thereof, from the first slider and first utility bundle tracker, whereby extension or retraction of the passenger loading bridge causes the utility bundle to be removed from, or pushed into the box.

15. The service transport unit of claim 14 wherein each turn is about 180°.

16. The service transport unit of claims 14 or 15 wherein each utility bundle tracker is slidably mounted upon the respective slider.

17. The service transport unit of claim 14 wherein the first and second utility bundle trackers each consists of two orthogonal surfaces.

18. The service transport unit of claim 14 wherein the first and second sliders are rectangular in cross section.

19. The service transport unit of claim 8 wherein the first and second sliders are hollow.

20. The service transport unit of claim 14 further comprising first and second end pieces each parallel to the side walls of the box, the first and second end pieces serving to guide the movement of the first and second sliders.

21. The service transport unit of claim 14 further comprising a post for securing the midpoint of the at least one utility line.

22. The service transport unit of claim 14 wherein the utility lines comprising a utility bundle are held together with at least one utility bundle clip.

23. The service transport unit of claim 15 wherein at least one utility bundle clip is attached to each of the first and second sliders.

24. The service transport unit of claims 1 or 14 wherein the box is mounted beneath a passenger loading bridge.

25. The service transport unit of claims 1 or 14 wherein the utility bundle is continuous therethrough.

26. The service transport unit of claim 14 wherein utility lines subject to pressure loading do not substantially expand in a radial dimension, and extend by about 1% upon pressure loading.

27. The service transport unit of claim 22 wherein utility lines not subject to pressure loading move within the utility bundle clip, while utility lines subject to pressure loading do not.

28. The service transport unit of claim 22 wherein utility lines subject to pressure loading are secured to the utility clip while utility lines not subject to pressure loading are not so secured.

* * * * *